United States Patent

Folkmar

[11] Patent Number: 6,058,572
[45] Date of Patent: May 9, 2000

[54] CLIP

[76] Inventor: Jan Folkmar, Arnika, CH-7050 Arosa, Switzerland

[21] Appl. No.: 08/948,411

[22] Filed: Oct. 9, 1997

[51] Int. Cl.$^7$ .............................. B65D 77/00; B65D 33/00
[52] U.S. Cl. ...................................... 24/30.5 R; 24/30.5 P; 24/543
[58] Field of Search ............................ 24/30.5 R, 30.5 P, 24/30.5 W, 543, 561, 556; 251/10; 248/222.12

[56] References Cited

U.S. PATENT DOCUMENTS

| | | | |
|---|---|---|---|
| 4,275,485 | 6/1981 | Hutchison | 24/30.5 R |
| 4,296,529 | 10/1981 | Brown | 24/30.5 P |
| 4,382,453 | 5/1983 | Bujan et al. | 24/543 |
| 4,551,888 | 11/1985 | Beecher | 24/543 |
| 4,656,697 | 4/1987 | Naslund | 24/30.5 P |
| 4,887,335 | 12/1989 | Folkmar | 24/30.5 R |
| 4,923,153 | 5/1990 | Matsui et al. | 24/30.5 R |
| 5,423,831 | 6/1995 | Nates | 24/543 |
| 5,713,108 | 2/1998 | Solomon et al. | 24/30.5 R |

*Primary Examiner*—Victor N. Sakran
*Attorney, Agent, or Firm*—Ridout & Maybee

[57] ABSTRACT

A reusable clip for closing plastic bags comprises a pair of jaws which are hinged together, and a releasable latch. One of the jaws is provided with a rib, the other a channel within which the rib is received, wherein at least one of the rib and channelled jaw being formed in medial portions with a lacuna as seen in profile, with a clearance between such medial portions when the jaws are closed. The lacuna assists in locating the clip relative to the bag, and permits the gathering of the neck of the bag whereby a substantial reduction in the size of the clip is possible in comparison to prior art clips.

7 Claims, 2 Drawing Sheets

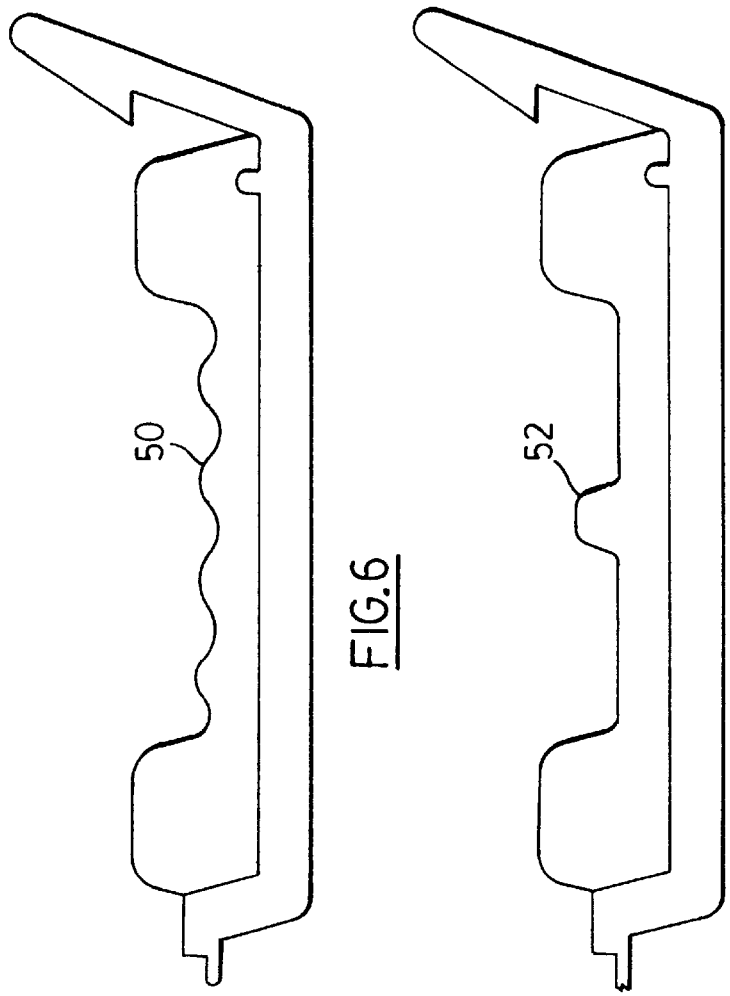
FIG.1
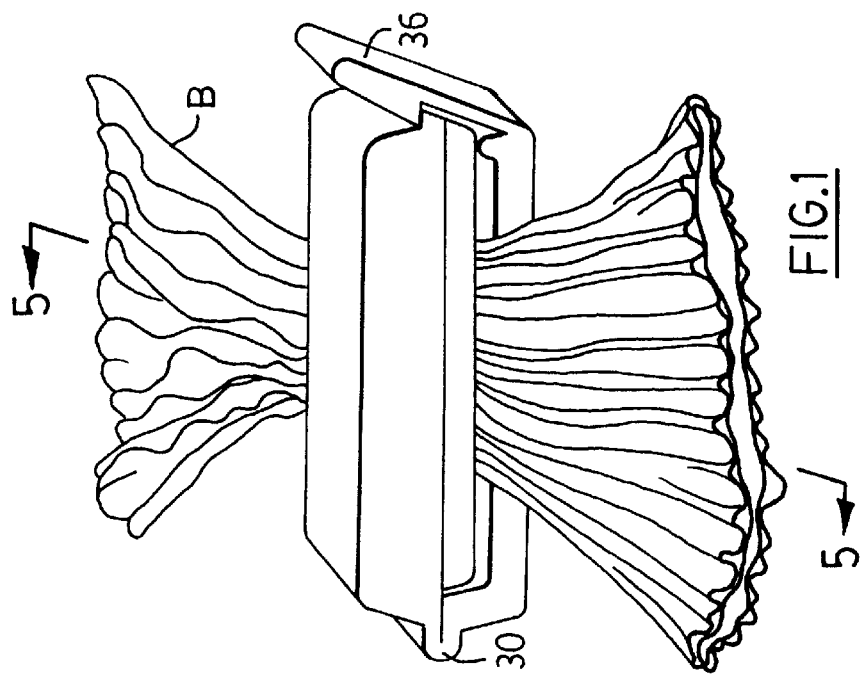
FIG.6
FIG.7

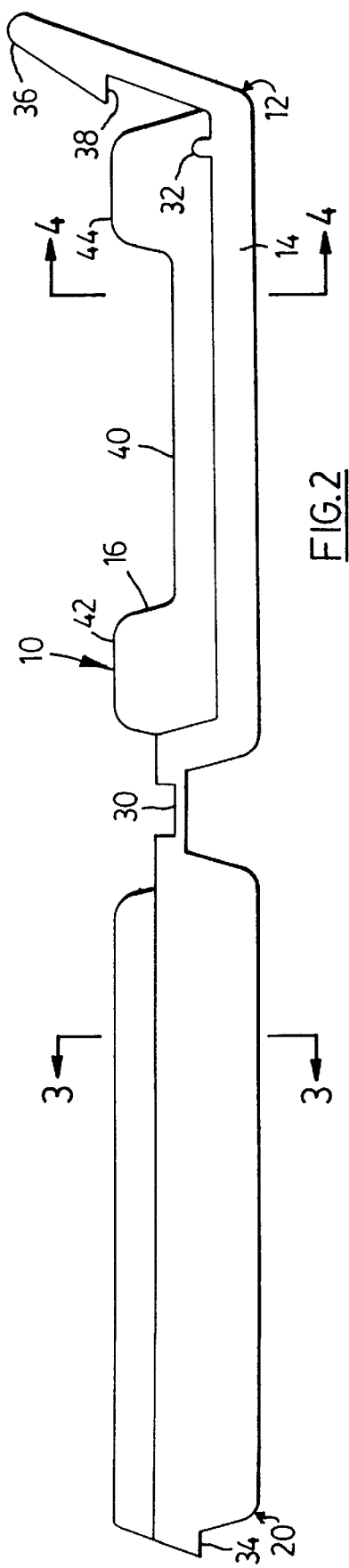
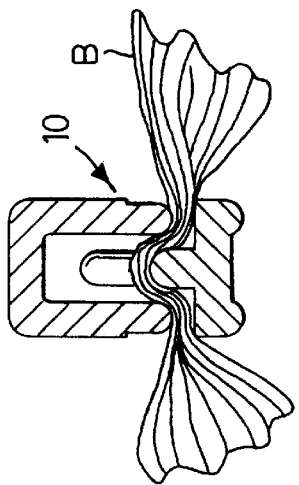
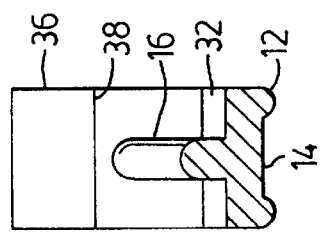
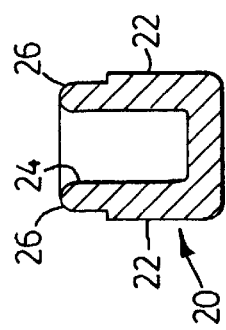

CLIP

FIELD OF INVENTION

This invention relates to a reusable clip member for closing plastic bags or the like, for example freezer bags, although it is not necessarily limited to such use.

BACKGROUND OF INVENTION

Reusable clips are well know in commerce; as described in U.S. Pat. No. 4,887,335, of common inventorship herewith, they may comprise a pair of generally co-extensive, axially extending jaws, one of which has a channel therealong, the other an upstanding rib. The jaws are hinged together at one axial end of each so as to be moveable into mutually confronting relationship, with the rib of the one jaw interleaved with the channel opening, so as to bear upon the interior walls along their length, and elastically deformed the channel walls. Latch means are disposed at the axial ends of the jaws opposed to the hinge for releasably latching the jaws in their closed position. A plastic bag is sealed with the clip by the action of compressing the opposed surfaces of the bag between the rib and the channel walls. Other clips of a similar nature are known, for example as described in U.S. Pat. No. 4,656,697. In all of these clips the jaws have a more or less uniform transverse cross-section along their length, and it is usually intended that a bag to be sealed will extend over the whole length of the jaws. Given that the clips may be used with bags of different sizes, it may arise that the bag will overhang the jaws somewhat, thereby interfering with the latch and/or the hinge, and quite possibly puncturing the bag.

The clips are typically low cost items, and any reduction in size may provide an important economy in manufacturing cost, and further it may facilitate the packaging of the clips for distribution with the plastic bags.

It is an object of this invention to provide clips which facilitate the positioning of a bag relative to the clip prior to closure.

It is another object with this invention to provide clips of a reduced size and cost, for a given size of a bag to be closed.

SUMMARY OF THE INVENTION

In accordance with one aspect of this invention, a clip which is broadly of the foregoing nature is formed with a lacuna in at least one of the rib portion of one jaw and the channelled jaw, as seen in profile. Preferably, the lacuna is provided in the rib portion only, suitably extending over not less than about 50 percent of the axial length of the rib. The lacuna suitably reduces the degree to which the rib interleafs within the channel, and in practice it is found that the upper surface of the rib in the lacuna portion thereof may be more or less in the plane of the entrance to the channel in the confronting portion thereof. Also suitably and preferably, the jaws in the confronting portions of the lacuna will be spaced apart marginally so as to provide a serpentine passage therebetween within which the walls of the bag will locate and be compressed to form a seal.

A clip of this nature will permit the walls of the bag to be enclosed to be gathered together in a bunched manner, and the end portions of the rib, which form upstanding tabs, will serve to retain the gather therebetween. Accordingly, it is less likely that the bag will extend axially beyond the rib so as to interfere with the latch or the hinge of the clip. The gathering of the bag in this manner permits the axial length of the clip to be reduced, in comparison to the prior art clips, with a reduction of some 50 percent being wholly feasible for a given bag size.

BRIEF DESCRIPTION OF THE DRAWINGS

FIG. 1 shows a clip in accordance with the invention, in a closed perspective view, with a portion of a bag engaged thereby;

FIG. 2 shows the clip of FIG. 1 open and in side elevation;

FIG. 3 is a section on line 3—3 of FIG. 2;

FIG. 4 is a section on line 4—4 of FIG. 2;

FIG. 5 is a section on line 5—5 of FIG. 1; and

FIG. 6 and FIG. 7 are similar to FIG. 2, but show the right-hand side portion of the clip only, and illustrate variants of the rib structure.

DESCRIPTION OF THE PREFERRED EMBODIMENT

Referring to the drawings in detail, a clip in accordance with the invention is identified generally therein by the numeral 10. Clip 10 comprises a first jaw 12 including a flange portion 14 and a rib portion 16 upstanding therefrom in axial alignment therewith. Clip 10 further comprises a second jaw 20 defined in part by a pair of axially extending side walls 22 defining a channel 24 therebetween, the side walls terminating along their upper edge with lips 26. Jaws 12 and 20 are interconnected by a hinge 30 to permit the jaws to be swung into mutually confronting relationship. A small, transversely aligned shoulder 32 is disposed on flange portion 14 adjacent the axial end thereof opposed to hinge 30, the shoulder and the hinge serving to space flange portion 14 marginally apart from lips 26 along their length. Jaws 12 and 20 are provided with co-operating latching means comprising a toothed shoulder 34 on the one jaw in axially opposed relationship to hinge 30, and a resilient tongue 36 disposed on the other jaw, the tongue having a toothed shoulder 38 thereon.

Rib portion 16 of jaw 12 is shaped in profile so as to form a lacuna 40 which extends over approximately one-half of the length of the rib portion in medial portions thereof, which lacuna is defined in part by upstanding tabs 42, 44 respectively disposed adjacent the lateral ends of jaw 12. Rib portion 16 in lacuna portion 40 thereof is dimensioned in its thickness so as to provide a lateral clearance from the interior wall surfaces of side walls 22 of channel 24, while the height of this rib portion is such that the rib only marginally penetrates within channel 24. Tab portions 42, 44 penetrate more fully within channel 24, but the degree of penetration and the thickness of the tab portions is not critical, as will be apparent from the following description of the manner of operation of clip 10.

Clip 10 is used to close and seal the bag B of FIG. 1; such bag may typically have a wall thickness in the range of about 0.04 mm to about 0.08 mm, and may have a width in the portion thereof to be sealed which is several times that of the axial length of lacuna portion 40 of rib 16. Bag B is gathered in a haphazard manner within the lacuna 40, and jaw 20 is rotated about hinge 30 to permit the snap engagement of toothed elements 34 and 38, whereby jaws 12 and 20 compress the multiple layers of bag B therebetween along a serpentine path to provide a seal. The compression of multiple layers of bag B between jaws 12 and 20 may give rise to undesirable skewing forces on both hinge 30 and the latching elements as the jaws are moved to their confronting relationship; detaching or skewing forces may also arise if bag B is pulled relative to clip 10 following the securement of the clip about the bag. These skewing forces are generally nullified by tabs 42, 44 which engage the side walls 22 of channel 24.

The degree to which clip 10 grips onto bag 10 may be controlled easily by varying the profile of rib 16 in the lacuna portion. One such variation is shown in FIG. 6 where the rib in the lacuna portion is provided with undulations 50. A further variation is shown in FIG. 7 wherein the toothed element 52 is provided on rib 16 in the lacuna portion 40. Where the axial length of lacuna portion 40 permits, a plurality of toothed elements may be provided. Other variations will occur to those skilled in the art.

I claim:

1. In a clip closure for plastic bags or the like comprising a pair of generally co-extensive axially extending jaws, one said jaw having a channel extending therealong, and the other said jaw having a rib upstanding therefrom, hinge means uniting said jaws adjacent one axial end thereof whereby said jaws are rotatable into a closed, mutually confronting relationship with said rib interleaved within said channel, and latch means disposed adjacent the axial ends of said jaws in opposed relation to said hinge means for releasably latching said jaws in said closed position;

the improvement wherein at least one of said rib portion and channelled jaw is formed with a lacuna as seen in profile, said lacuna serving to assist in locating said jaws about a bag to be sealed thereby prior to the bag being sealed.

2. A clip as defined in claim 1 wherein said rib portion only is provided with said lacuna and said channelled member is generally uniform therealong in lateral cross-section.

3. A clip as defined in claim 2 wherein said rib in said lacuna portion has a transverse dimension less than the transverse dimension of said channel in confronting portion thereof, so as to space said rib from said channel.

4. A clip as defined in claim 3 wherein said channel includes lips and said other jaw comprises a flange from which said rib is upstanding, and where a small clearance is provided between said lip and said flange in said lacuna portion.

5. A clip as defined in claim 3 wherein said rib in said lacuna portion is undulated in profile.

6. A clip as defined in claim 3 wherein said rib is provided in said lacuna portion with upstanding tooth means.

7. A clip as defined in claim 2 wherein said lacuna extends over about 50 percent of said rib portion.

* * * * *